(12) United States Patent
    Seiji et al.

(10) Patent No.: US 12,606,015 B2
(45) Date of Patent: Apr. 21, 2026

(54) SADDLE-TYPE VEHICLE

(71) Applicant: HONDA MOTOR CO., LTD., Tokyo (JP)

(72) Inventors: Tatsuya Seiji, Tokyo (JP); Kenji Kawai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 398 days.

(21) Appl. No.: 18/557,137

(22) PCT Filed: Mar. 15, 2022

(86) PCT No.: PCT/JP2022/011638
    § 371 (c)(1),
    (2) Date: Oct. 25, 2023

(87) PCT Pub. No.: WO2022/239461
    PCT Pub. Date: Nov. 17, 2022

(65) Prior Publication Data
    US 2024/0217334 A1      Jul. 4, 2024

(30) Foreign Application Priority Data

May 12, 2021    (JP) ................................. 2021-080929

(51) Int. Cl.
    *B60K 15/04*         (2006.01)
    *B62J 35/00*         (2006.01)
    *B62J 37/00*         (2006.01)
(52) U.S. Cl.
    CPC ........... *B60K 15/0409* (2013.01); *B62J 35/00* (2013.01); *B62J 37/00* (2013.01); *B60K 2015/0416* (2013.01); *B60K 2015/0445* (2013.01)

(58) Field of Classification Search
    CPC ........ B60K 15/0409; B60K 2015/0416; B60K 2015/0445; B62J 11/13; B62J 35/00; B62J 37/00
    See application file for complete search history.

(56) References Cited

U.S. PATENT DOCUMENTS 2,054,145 A * 9/1936 Tandy .................... B60K 15/05
                                                    220/255
6,193,093 B1 * 2/2001 Brunner ............. B60K 15/0406
                                                    220/234

(Continued)

FOREIGN PATENT DOCUMENTS

JP        S51-153954 U      12/1976
JP        S60-134754 U       9/1985

(Continued)

OTHER PUBLICATIONS

English translation of the International Preliminary Report on Patentability mailed Nov. 23, 2023 in corresponding International application No. PCT/JP2022/011638 (5 pages).

(Continued)

*Primary Examiner* — Tyler J Lee
(74) *Attorney, Agent, or Firm* — Rankin, Hill & Clark LLP

(57)                 ABSTRACT

A saddle-type vehicle includes a fuel tank, a tank cap that covers the refueling port provided in the fuel tank in an openable/closable manner, and an operation cable that performs an unlocking operation of the tank cap, wherein the fuel tank includes a first opening and a second opening that extend through the fuel tank, the path member is provided that passes through an interior of the fuel tank and connects the first opening and the second opening, the operation cable is arranged through an interior of the path member, and the operation cable protruding outward from the first opening is (Continued)

connected to the unlocking mechanism for unlocking the tank cap.

15 Claims, 6 Drawing Sheets

(56) References Cited

U.S. PATENT DOCUMENTS

| | | | | |
|---|---|---|---|---|
| 6,234,557 | B1 * | 5/2001 | Bae | E05B 83/34 |
| | | | | 296/97.22 |
| 7,117,904 | B2 * | 10/2006 | Strasser | G01F 23/24 |
| | | | | 73/290 R |
| 9,579,971 | B2 * | 2/2017 | Koishikawa | B60K 15/0406 |
| 11,685,255 | B2 * | 6/2023 | Mimura | E05B 81/08 |
| | | | | 70/162 |
| 2006/0027284 | A1 * | 2/2006 | Strasser | G01F 23/22 |
| | | | | 141/95 |
| 2006/0288748 | A1 * | 12/2006 | Yonemura | E05B 17/183 |
| | | | | 70/423 |
| 2010/0156118 | A1 * | 6/2010 | Codeluppi | E05B 47/0696 |
| | | | | 292/52 |
| 2011/0083772 | A1 * | 4/2011 | Whelan | B60K 15/0406 |
| | | | | 141/369 |
| 2015/0041466 | A1 * | 2/2015 | Koishikawa | B62J 35/00 |
| | | | | 220/203.01 |
| 2018/0334028 | A1 * | 11/2018 | Kim | B60K 15/0409 |
| 2020/0384853 | A1 * | 12/2020 | Mimura | E05B 81/08 |

FOREIGN PATENT DOCUMENTS

| | | |
|---|---|---|
| JP | H9-123971 A | 5/1997 |
| JP | 2010-125863 A | 6/2010 |
| JP | 2013-52824 A | 3/2013 |
| WO | 2020/203802 A1 | 10/2020 |

OTHER PUBLICATIONS

Japanese Office Action dated Oct. 8, 2024 issued in corresponding Japanese application No. 2021-080929; English translation included (9 pages).
International Search Report and Written Opinion corresponding to PCT/JP2022/011638, dated May 31, 2022, 7 pages.

* cited by examiner

FIG.2

SADDLE-TYPE VEHICLE

TECHNICAL FIELD

The present invention relates to a saddle-type vehicle.

BACKGROUND ART

There has been conventionally known a structure in which a steel wire (operation cable) for connecting an air vent knob provided on a tank cap and a valve of a fuel cock is arranged through an interior of a fuel tank (for example, see Patent Literature 1). In Patent Literature 1, the operation of the air vent knob is transmitted to the valve through the steel wire. The steel wire is arranged through the interior of the fuel tank in a state in which it is exposed in the fuel tank.

CITATION LIST

Patent Literature

[Patent Literature 1]
Japanese Utility Model Laid-Open No. 60-134754

SUMMARY OF INVENTION

Technical Problem

Incidentally, in the fuel tank of the saddle-type vehicle, the operation cable for performing an unlocking operation of the tank cap may be arranged through the outside of the fuel tank. In this case, a cover for hiding the operation cable is provided to improve the appearance, which leads to an increase in the number of components. In the above-described conventional fuel tank, the steel wire serving as the operation cable is exposed to the interior of the fuel tank, so that an arrangement path of the steel wire is not stable, which may make it difficult to operate an operation target.

The present invention has been made in view of the above circumstances, and an object thereof is to make it possible to arrange an operation cable for a tank cap with a simple structure and an excellent appearance, and to operate the operation cable satisfactorily.

Solution to Problem

This specification includes all the contents of Japanese Patent Application No. 2021-080929 filed on May 12, 2021.

A saddle-type vehicle comprises a fuel tank, a tank cap that covers a refueling port provided in the fuel tank in an openable/closable manner, and an operation cable that performs an unlocking operation of the tank cap, wherein the fuel tank comprises a first opening and a second opening that extend through the fuel tank, a path member is provided which passes through an interior of the fuel tank and connects the first opening and the second opening, the operation cable is arranged through an interior of the path member, and the operation cable protruding outward from the first opening is connected to an unlocking mechanism for unlocking the tank cap.

Advantageous Effects of Invention

The present invention makes it possible to arrange an operation cable for a tank cap with a simple structure and an excellent appearance, and to operate the operation cable satisfactorily.

BRIEF DESCRIPTION OF DRAWINGS

FIG. 2 is a plan view seen from above of the saddle-type vehicle.

DESCRIPTION OF EMBODIMENT

Figure 1:
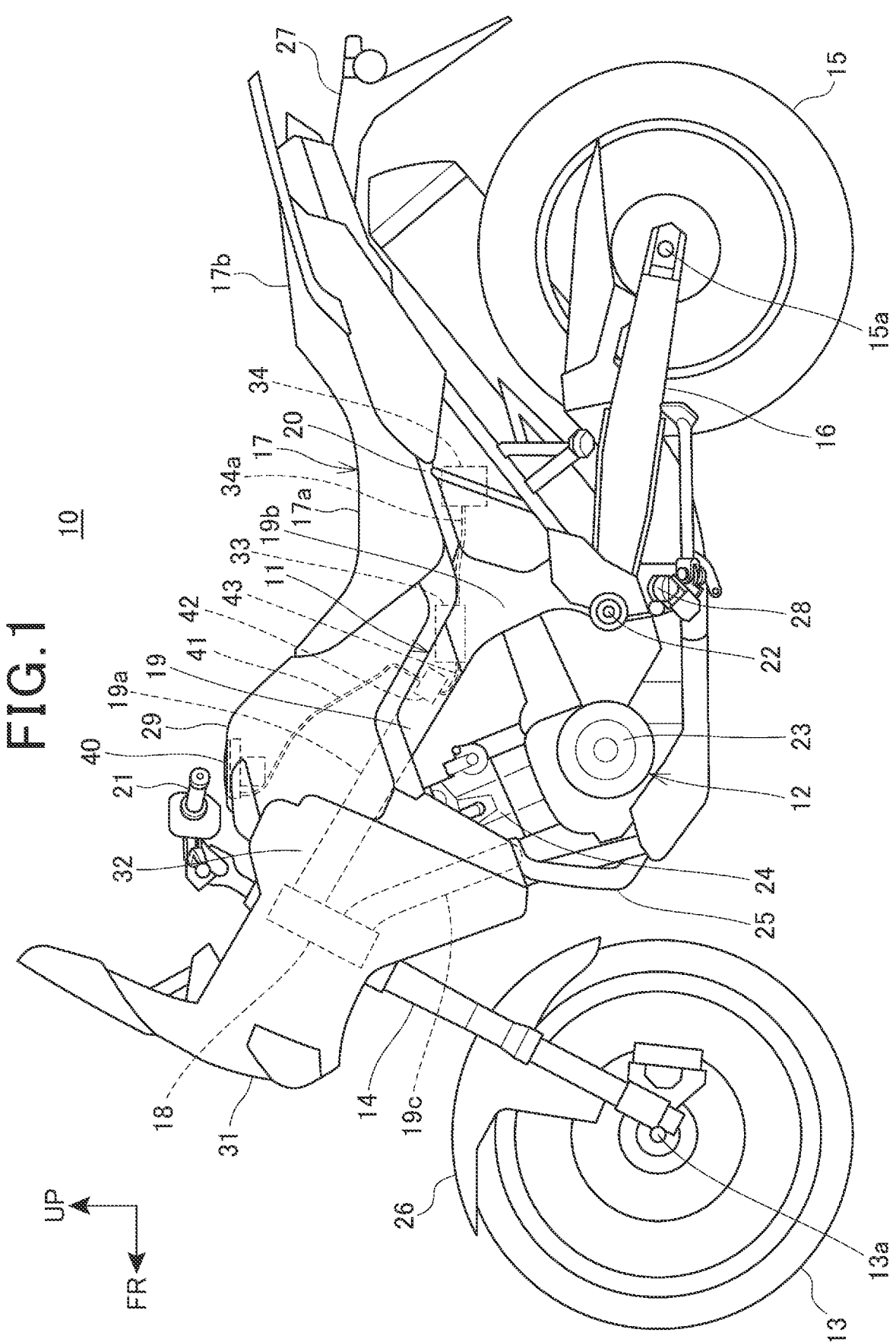
FIG. 1 is a side view of a saddle-type vehicle according to an embodiment of the present invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

EMBODIMENT

FIG. 1 is a side view of a saddle-type vehicle 10 according to an embodiment of the present invention.

The saddle-type vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-type vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-type vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The front frame 19 includes a pair of left and right main frames 19*a* that extend rearwardly downward from the head pipe 18, a pair of left and right pivot frames 19*b* that extend downward from rear ends of the main frames 19*a*, and a pair of left and right down frames 19*c* that extend downward from a position of the head pipe 18 below front ends of the main frames 19*a*.

Figure 2:
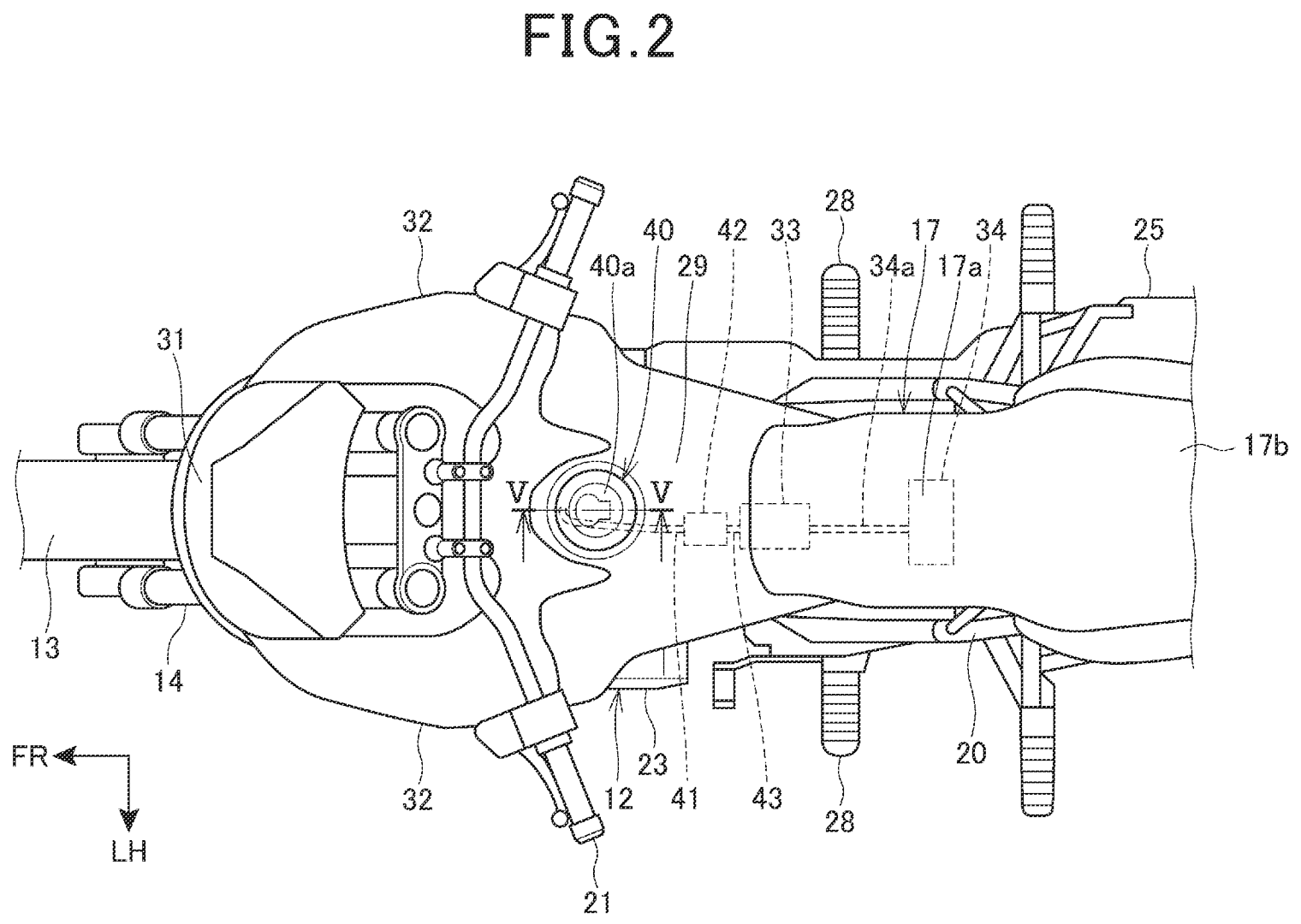

FIG. 2 is a plan view seen from above of the saddle-type vehicle 10.

Referring to FIGS. 1 and 2, the saddle-type vehicle 10 includes a front cover 31 that covers the head pipe 18 from the front, and a pair of left and right side covers 32 that cover the front end portion of the vehicle body frame 11 from the outside in the vehicle width direction, as vehicle body covers covering the vehicle body constituted by the vehicle body frame 11 and the like.

The fuel tank 29 is disposed between the head pipe 18 and the seat 17 as seen in a vehicle front-rear direction. The fuel tank 29 is disposed above the left and right main frames 19*a*, and is supported by the main frames 19*a*.

A tank cap 40 that covers the fuel tank 29 in an openable/closable manner is provided in an upper surface of a front portion of the fuel tank 29. The tank cap 40 is disposed at a center in the vehicle width direction.

The seat 17 integrally includes a front seat 17*a* on which a driver is seated and a rear seat 17*b* on which a passenger is seated. The rear seat 17*b* is provided one step higher than the front seat 17*a* in the rear of the front seat 17*a*. A front end portion of the front seat 17*a* covers a rear portion of the fuel tank 29 from above. The upper surface of the fuel tank 29 is located higher than an upper surface of the rear seat 17*b*.

A control unit 33 that electronically controls each part, including the power unit 12, of the saddle-type vehicle 10 is disposed below the rear portion of the fuel tank 29. The control unit 33 is disposed in the rear of the cylinder 24 and above a rear portion of the crankcase 23, and between rear portions of the left and right main frames 19*a*.

A battery 34 that supplies power to each part of the saddle-type vehicle 10 is disposed below the front seat 17*a* and is covered by the front seat 17*a* from above. The battery 34 is disposed in the rear of the control unit 33 and below the fuel tank 29. The battery 34 is connected to the control unit 33 by an electric wire 34*a* extending forwardly from the battery 34.

The saddle-type vehicle 10 includes an operation cable 41 that performs an unlocking operation of the tank cap 40 and a solenoid 42 that drives the operation cable.

The operation cable 41 is connected to the solenoid 42.

The solenoid 42 is connected to the control unit 33 through an electric wire 43.

The control unit 33 drives and controls the solenoid 42 to drive the operation cable 41, and unlocks the tank cap 40.

The solenoid 42 is disposed below the fuel tank 29. The solenoid 42 is disposed in the rear of the cylinder 24 and above the rear portion of the crankcase 23, and between the rear portions of the left and right main frames 19*a*. The solenoid 42 is disposed on a front upper side of the control unit 33.

The solenoid 42 and the control unit 33 are disposed under an upper surface 40*a* of the tank cap 40. The fuel tank 29 overlaps with the solenoid 42 and the control unit 33 from above in a plan view.

Figure 3:
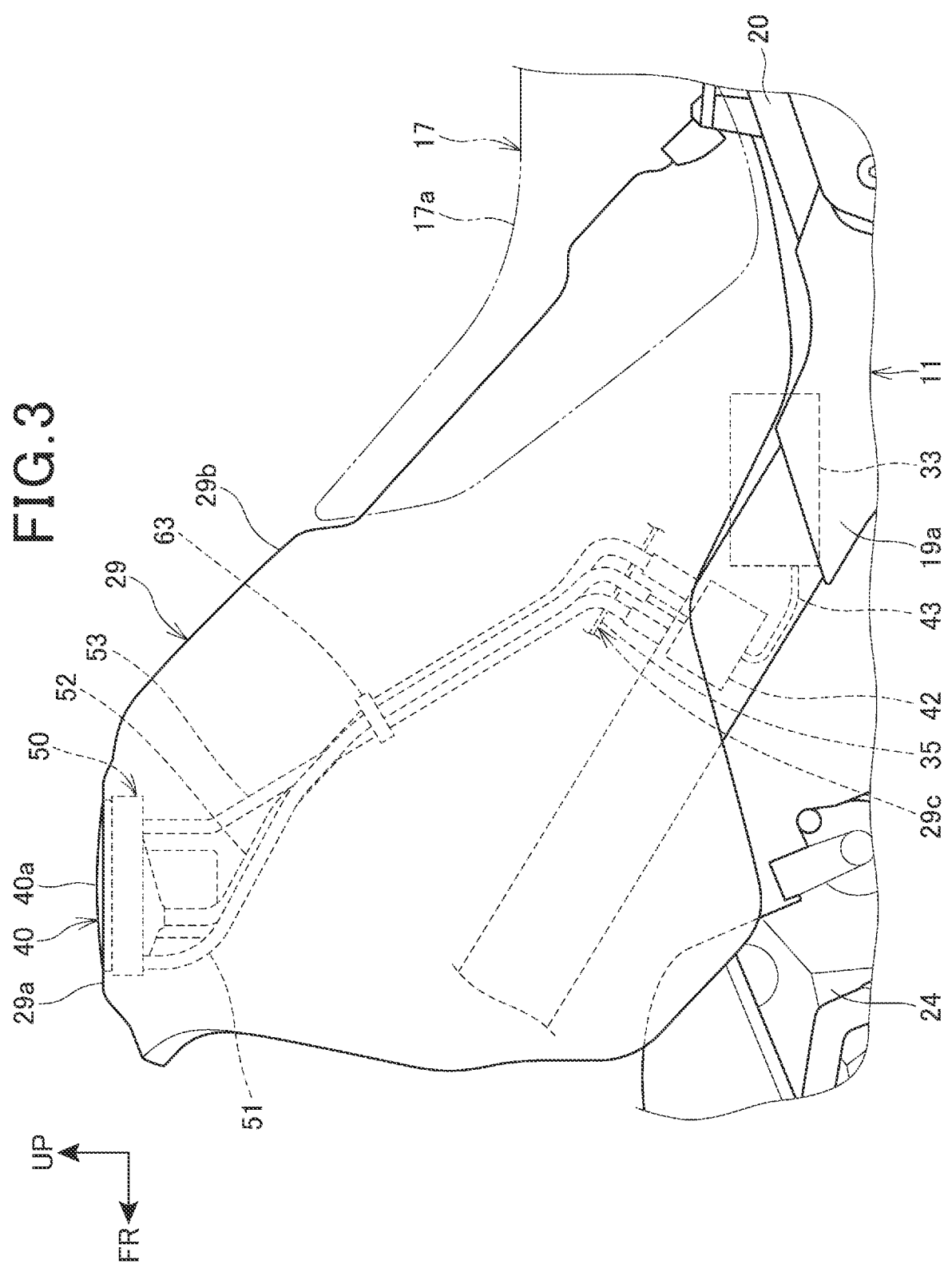
FIG. 3 is a left side view of a fuel tank and portions around the fuel tank.

FIG. 3 is a left side view of the fuel tank 29 and portions around the fuel tank 29.

An upper surface 29*a* of the fuel tank 29 is substantially horizontal in a front portion of the fuel tank 29 as viewed from a side of the vehicle. A rear surface 29*b* of the fuel tank 29 is an inclined surface extending rearwardly downward from a rear end of the upper surface 29*a* as viewed from the side of the vehicle.

The upper surface 29*a* of the fuel tank 29 is provided with a cap attachment portion 50 to which the tank cap 40 is attached.

A path member 51 through which the operation cable 41 passes, a drain pipe 52, and a breather pipe 53 are arranged through the interior of the fuel tank 29. The path member 51, the drain pipe 52, and the breather pipe 53 are made of metal, for example.

Figure 4:
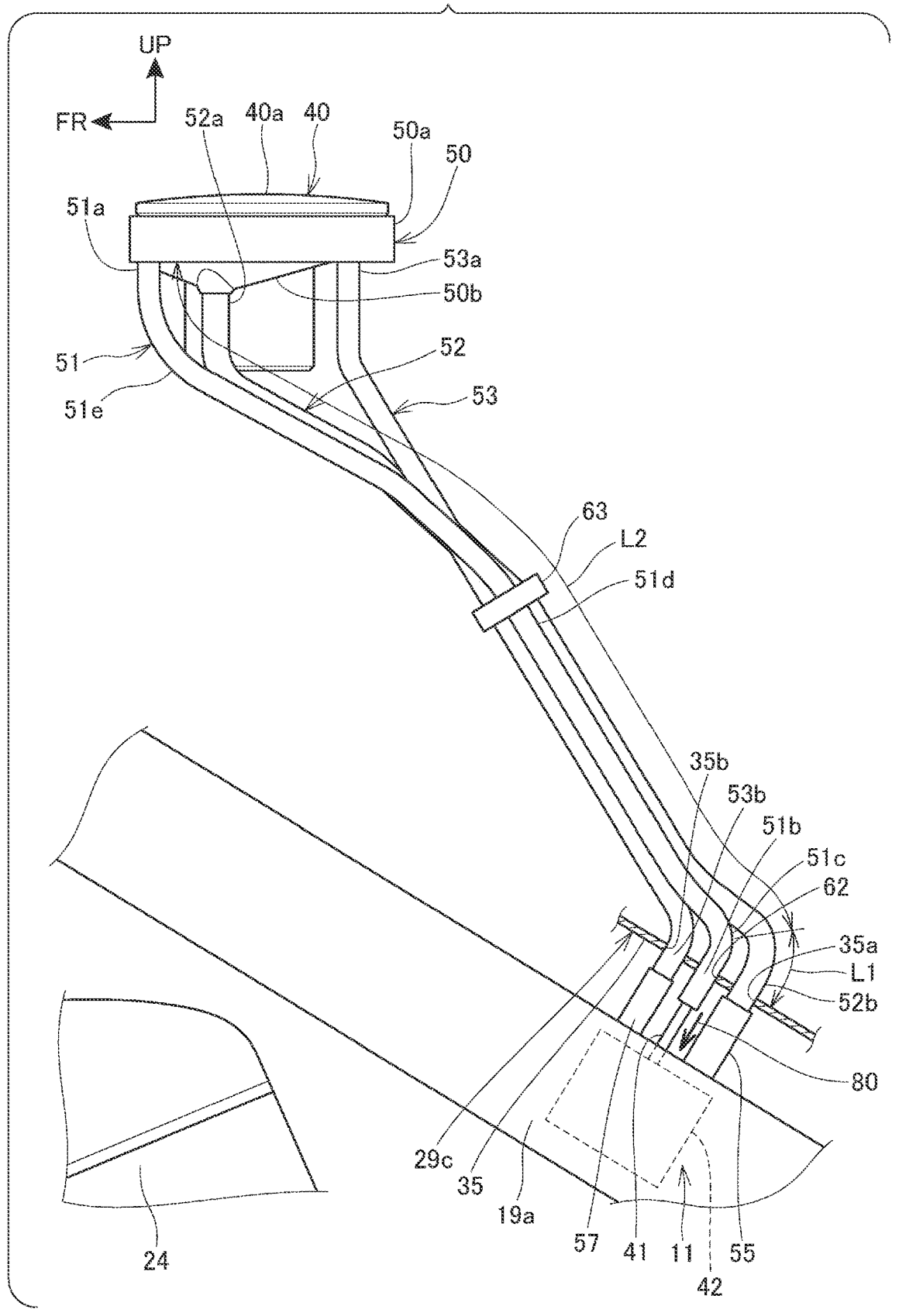
FIG. 4 is a left side view illustrating an arrangement state of a path member, a drain pipe, and a breather pipe.
Figure 5:
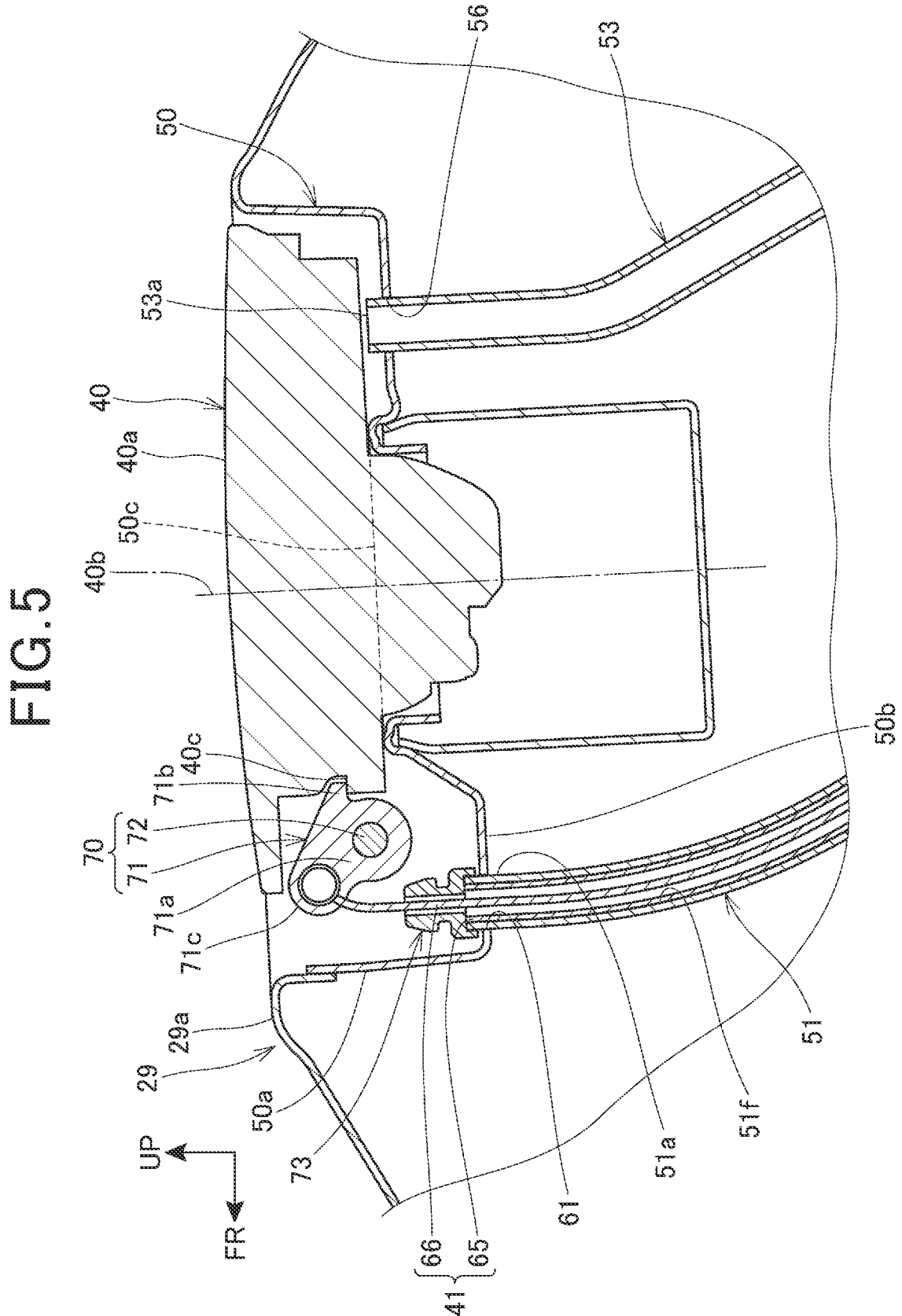
FIG. 5 is a sectional view taken along a line V-V of FIG. 2.

FIG. 4 is a left side view illustrating an arrangement state of the path member 51, the drain pipe 52, and the breather pipe 53. FIG. 5 is a sectional view taken along a line V-V of FIG. 2 and illustrates a cross section of the cap attachment portion 50 and the tank cap 40.

The cap attachment portion 50 is a recess formed so that a part of the upper surface 29*a* is recessed downward, and the tank cap 40 is disposed in the recess. The cap attachment portion 50 includes an annular peripheral wall 50*a* that surrounds the tank cap 40 from its periphery, a bottom surface 50*b* that forms a bottom surface of the above-described recess, and a refueling port 50*c* that extends through the bottom surface 50*b*. The peripheral wall 50*a* extends upward from a peripheral edge of the disk-shaped bottom surface 50*b*. The refueling port 50*c* is provided at the center of the bottom surface 50*b* in the plan view.

The tank cap 40 covers and closes the refueling port 50*c* from above. Fuel is injected into the fuel tank 29 through the refueling port 50*c* with the tank cap 40 opened. The cap attachment portion 50 collects fuel overflowing to the periphery of the refueling port 50*c* during supplying the fuel.

The path member 51, the drain pipe 52, and the breather pipe 53 extend downward from the cap attachment portion 50 and are individually connected to a lower surface 29*c* (FIG. 4) of the fuel tank 29. The lower surface 29*c* includes, in the rear portion of the fuel tank 29, a tank bottom wall 35 that is inclined rearwardly downward as viewed from the side of the vehicle.

The tank bottom wall 35 is inclined rearwardly downward along the main frames 19*a*. The tank bottom wall 35 is located above the main frames 19*a* and between the left and right main frames 19*a*. The tank bottom wall 35 is located on a rear lower side of the cap attachment portion 50.

The drain pipe 52 is a pipe that extends in the up-down direction through the fuel tank 29. The drain pipe 52 drains water and fuel collected in the cap attachment portion 50 to the outside of the fuel tank 29. An upper end portion 52*a* of the drain pipe 52 is connected to a portion around the refueling port 50*c* in the bottom surface 50*b* of the cap attachment portion 50. An upper end surface of the drain pipe 52 is open upward of the bottom surface 50*b*. The drain pipe 52 extends obliquely rearwardly downward from the bottom surface 50*b* in the fuel tank 29.

A lower end portion 52*b* of the drain pipe 52 (one end portion of the pipe) is connected to the tank bottom wall 35. The tank bottom wall 35 includes a drain pipe connecting portion 35*a* (pipe connecting portion) to which the lower end portion 52*b* is connected. The drain pipe connecting portion 35*a* is a hole into which the lower end portion 52*b* is fitted. The lower end portion 52*b* is fitted into the drain pipe connecting portion 35*a*, and is joined to the drain pipe connecting portion 35*a* by welding, for example.

The lower end portion 52*b* is disposed perpendicularly to the tank bottom wall 35 inclined rearwardly downward, and therefore extends rearwardly upward as viewed from the side of the vehicle. The drain pipe 52 is bent forwardly upward toward the cap attachment portion 50 side above the lower end portion 52*b*, and extends upward toward the cap attachment portion 50.

A drain tube 55 is connected to a portion of the lower end portion 52*b* of the drain pipe 52, the portion protruding downward from the tank bottom wall 35. The drain tube 55 extends downward and is open downward in the lower portion of the vehicle body. The drain tube 55 is made of rubber, for example.

The breather pipe 53 is a pipe that extends in the up-down direction through the fuel tank 29. The breather pipe 53 enables the interior of the fuel tank 29 to communicate with the atmosphere.

A breather pipe upper connecting portion 56 to which an upper end portion 53*a* of the breather pipe 53 is connected is provided in the bottom surface 50*b* of the cap attachment portion 50. The breather pipe upper connecting portion 56 is a hole into which the upper end portion 53*a* is fitted. The breather pipe upper connecting portion 56 is disposed around the refueling port 50*c*. The upper end portion 53*a* is fitted into the breather pipe upper connecting portion 56, and is joined to the breather pipe upper connecting portion 56 by welding, for example.

An upper end surface of the breather pipe 53 is open upward of the bottom surface 50*b*. The breather pipe 53 extends obliquely rearwardly downward from the bottom surface 50*b* so as to be along the drain pipe 52 in the fuel tank 29.

A lower end portion 53*b* of the breather pipe 53 (one end portion of the pipe) is connected to the tank bottom wall 35. The tank bottom wall 35 includes a breather pipe connecting portion 35*b* (pipe connecting portion) to which the lower end portion 53*b* is connected. The breather pipe connecting portion 35*b* is a hole into which the lower end portion 53*b* is fitted. The lower end portion 53*b* is fitted into the breather pipe connecting portion 35*b*, and is joined to the breather pipe connecting portion 35*b* by welding, for example.

The lower end portion 53*b* is disposed perpendicularly to the tank bottom wall 35 inclined rearwardly downward, and therefore extends rearwardly upward in the vehicle side view. The breather pipe 53 is bent forwardly upward toward the cap attachment portion 50 side above the lower end portion 53*b*, and extends upward toward the cap attachment portion 50.

A breather tube 57 is connected to a portion of the lower end portion 53*b* of the breather pipe 53, the portion protruding downward from the tank bottom wall 35. A lower end portion of the breather tube 57 is open downward. The breather tube 57 is made of rubber, for example.

The fuel tank 29 includes a first opening 61 that extends through the bottom surface 50*b* of the cap attachment portion 50 and a second opening 62 that extends through the tank bottom wall 35. The first opening 61 is disposed around the refueling port 50*c*. The second opening 62 is located on a rear lower side of the first opening 61.

The path member 51 is a pipe that extends in the up-down direction through the fuel tank 29, and includes a hole 51*f* that axially extends through the path member 51. The path member 51 passes through the interior of the fuel tank 29 and connects the first opening 61 and the second opening 62.

An upper end portion 51*a* of the path member 51 is fitted into the first opening 61, and is joined to the first opening 61 by welding, for example.

An upper end surface of the upper end portion 51*a* is open upward of the bottom surface 50*b*.

In the first opening 61, the upper end portion 51*a* of the path member 51 extends in the up-down direction in parallel to an axis line 40*b* of the tank cap 40. Here, the term parallel includes substantial parallel. The upper end portion 51*a* and the axis line 40*a* extend substantially vertically. The axis line 40*b* coincides with an axis line of the refueling port 50*c*.

The path member 51 extends obliquely rearwardly downward from the bottom surface 50*b* in the fuel tank 29.

A lower end portion 51*b* of the path member 51 is connected to the second opening 62 of the tank bottom wall 35. The lower end portion 51*b* is fitted into the second opening 62, and is joined to the second opening 62 by welding, for example.

The lower end portion 51*b* is disposed perpendicularly to the tank bottom wall 35 inclined rearwardly downward, and therefore extends rearwardly upward as viewed from the side of the vehicle.

Specifically, the path member 51 includes the lower end portion 51*b*, a first bent portion 51*c* that is bent forwardly upward toward the first opening 61 side above the lower end portion 51*b*, an inclined portion 51*d* that extends obliquely forwardly upward from the first bent portion 51*c*, a second bent portion 51*e* that is bent upward from the inclined portion 51*d*, and the upper end portion 51*a* that extends upward vertically from the second bent portion 51*e*.

The path member 51 is directly connected to the fuel tank 29 only by the first opening 61 and the second opening 62. In other words, the path member 51 does not contact a wall surface of the fuel tank 29, except for the first opening 61 and the second opening 62. Therefore, the path member 51 can be further shortened as compared with the case where the path member 51 is arranged along an inner surface of the fuel tank 29, for example.

The inclined portion 51*d* of the path member 51 extends in the vehicle front-rear direction and the vertical direction as viewed from the side of the vehicle, so as to be along the drain pipe 52 and the breather tube 57.

The inclined portion 51*d* of the path member 51, the drain pipe 52, and the breather pipe 53 are bundled together by a holding member 63. The holding member 63 forms a band circumscribing the inclined portion 51*d*, the drain pipe 52 and the breather pipe 53. This enables the inclined portion 51*d*, the drain pipe 52, and the breather pipe 53 to support each other, and can support effectively the inclined portion 51*d*, the drain pipe 52, and the breather pipe 53.

In an axial direction of the path member 51, the first bent portion 51*c* is closer to the second opening 62 than the second bent portion 51*e*. The first bent portion 51*c* is closest to the second opening 62 out of the first bent portion 51*c* and the second bent portion 51*e*.

In the axial direction of the path member 51, a distance L1 between the first bent portion 51*c* and the second opening 62 is smaller than a distance L2 between the first bent portion 51*c* and the first opening 61. Therefore, the path member 51 can be arranged spaced from the inner surface of the fuel tank 29 and can be shortened.

Figure 6:
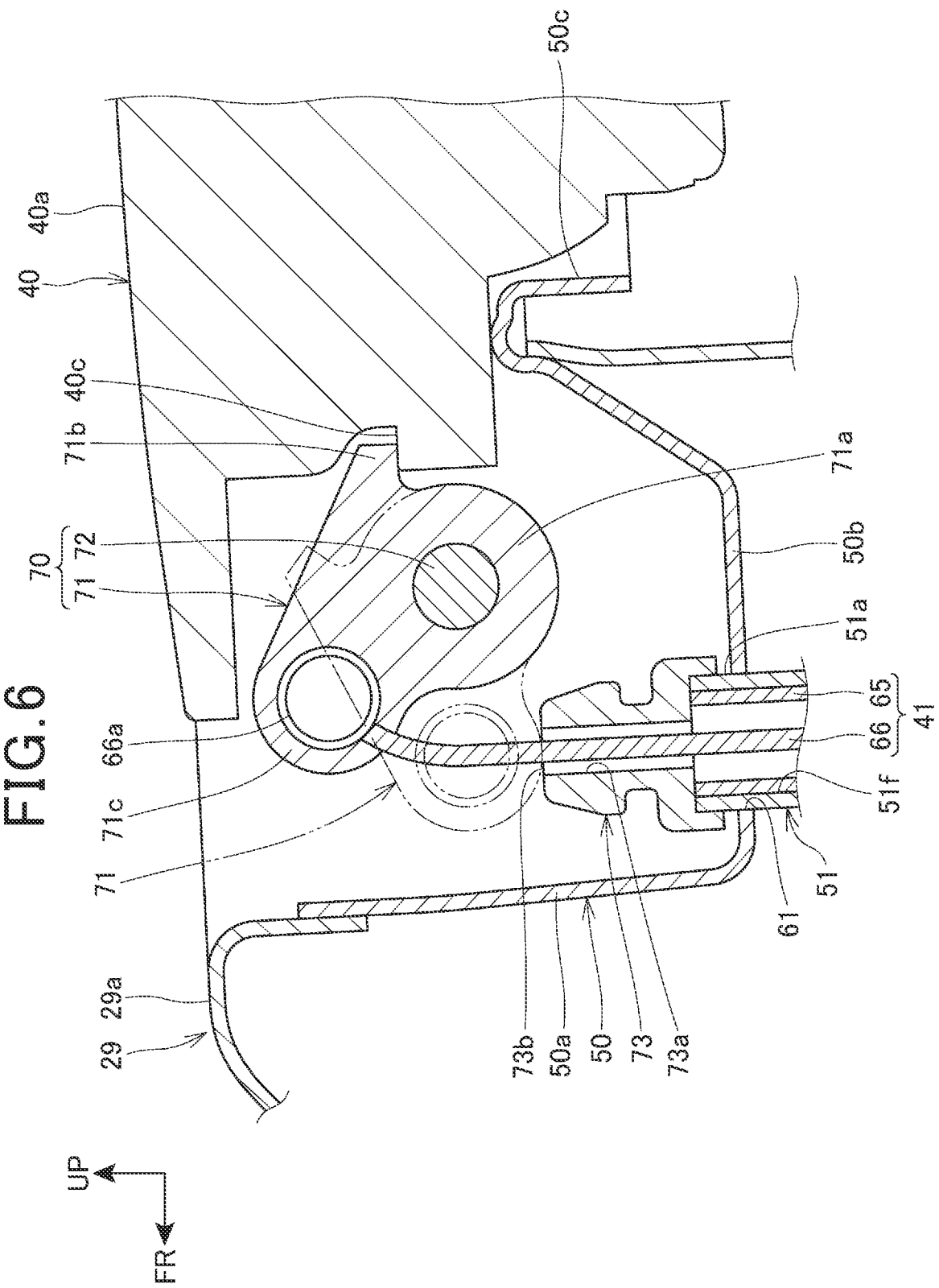
FIG. 6 is an enlarged sectional view of a first opening and portions around the first opening in FIG. 5.

FIG. 6 is an enlarged sectional view of the first opening 61 and portions around the first opening 61 in FIG. 5.

Referring to FIGS. 5 and 6, the operation cable 41 passes through the hole 51$f$ of the path member 51, and thereby is arranged inside of the fuel tank 29.

The operation cable 41 includes a cylindrical outer tube 65 and an inner cable 66 provided in the outer tube 65. The inner cable 66 is movable in the axial direction of the operation cable 41 within the outer tube 65.

An unlocking mechanism 70 that unlocks the tank cap 40 is provided in the cap attachment portion 50. The unlocking mechanism 70 is disposed between the peripheral wall 50$a$ of the cap attachment portion 50 and an outer periphery of the tank cap 40 above the first opening 61.

The unlocking mechanism 70 includes a locking member 71 that engages with the tank cap 40, and a turning shaft 72 that turnably supports the locking member 71.

The turning shaft 72 is a shaft extending in the vehicle width direction.

The locking member 71 includes a turning portion 71$a$ that is supported by the turning shaft 72 and is turned around the turning shaft 72, an engaging portion 71$b$ that protrudes from the turning portion 71$a$ toward the tank cap 40 side, and a cable coupling portion 71$c$ that extends from the turning portion 71$a$ toward the side opposite to the engaging portion 71$b$.

An engaged portion 40$c$ with which the engaging portion 71$b$ of the locking member 71 engages is provided in an outer periphery of the tank cap 40. The engaged portion 40$c$ is a groove, for example.

The inner cable 66 passes through the first opening 61 and extends outwardly upward from an upper end of the path member 51, and is coupled to the cable coupling portion 71$c$ of the locking member 71. Specifically, a cylindrical connecting member 66$a$ extending in the vehicle width direction is provided at an upper end of the inner cable 66. The inner cable 66 is coupled to the locking member 71 by turnably fitting the connecting member 66$a$ into a hole provided in the cable coupling portion 71$c$.

The upper end of the path member 51 protrudes upward from the bottom surface 50$b$. An upper end of the outer tube 65 is provided so as to be flush with the upper end of the path member 51. A cylindrical lid member 73 that closes an opening at the upper end of the path member 51 is attached to the upper end of the path member 51.

The lid member 73 is attached to the path member 5 by being fitted to an outer periphery of the upper end of the path member 51. The lid member 73 includes a cable passage hole 73$a$ that extends in the up-down direction through the lid member 73.

The inner cable 66 extends upward through the cable passage hole 73$a$ and is connected to the cable coupling portion 71$c$.

The lid member 73 suppresses intrusion of water and dust to the upper end of the path member 51.

Furthermore, the lid member 73 contacts the locking member 71 during the turning movement of the locking member 71, and stops the turning of the locking member 71.

Referring to FIG. 4, the lower end portion 51$b$ of the path member 51 protrudes downward from the tank bottom wall 35.

The operation cable 41 extends downward from a lower end of the path member 51, and is connected to the solenoid 42. Specifically, in the operation cable 41, a lower end of the inner cable 66 (FIG. 5) is connected to the solenoid 42.

An extension direction 80 of the operation cable 41 extending from the second opening 62 toward the solenoid 42 is a forwardly downward direction. A connection direction between the operation cable 41 and the solenoid 42 is the same direction as the extension direction 80. In other words, the operation cable 41 extending straight in the extension direction 80 is connected to the solenoid 42 as it is without changing the direction. A driving direction of the solenoid 42 is the same direction as the extension direction 80, and the solenoid 42 pulls the inner cable 66 in the extension direction 80. Therefore, the driving force of the solenoid 42 can be transmitted to the inner cable 66 efficiently.

Referring to FIG. 5, when a command to open the tank cap 40 is input in accordance with operation of an operation button or the like, the control unit 33 drives and controls the solenoid 42, so that the solenoid 42 drives the operation cable 41. When the operation cable 41 is driven, the locking member 71 is pulled downward by the inner cable 66, and is moved from a position indicated by a solid line to a position indicated by a virtual line in FIG. 6. This release engagement of the engaging portion 71$b$ from the engaged portion 40$c$, whereby the tank cap 40 is unlocked. The tank cap 40 is provided turnably about a hinge provided in the rear portion of the tank cap 40, for example. The tank cap 40 is turned upward about the above-described hinge with being unlocked and is opened.

The locking member 71 of the unlocking mechanism 70 contacts an upper surface 73$b$ of the lid member 73 during the unlocking operation, and a turning limit position is restricted. Therefore, the turning of the locking member 71 can be restricted using the lid member 73, and the turning of the locking member 71 can be restricted with a simple structure. Excessive turning of the locking member 71 can be restricted by the lid member 73, which makes it possible to reduce a load on the inner cable 66 during the unlocking operation. Therefore, the tank cap 40 can be unlocked satisfactorily even without increasing the thickness of the inner cable 66.

The operation cable 41 passes through the path member 51 arranged through the interior of the fuel tank 29, and therefore is not exposed to the outside of the fuel tank 29. This makes the operation cable 41 inconspicuous, and thus the saddle-type vehicle 10 has an excellent appearance. The operation cable 41 is guided by the path member 51 over the entire path from the first opening 61 to the second opening 62. This makes it possible to stabilize the arrangement path of the operation cable 41 and operate the operation cable 41 satisfactorily.

Referring to FIG. 4, the second opening 62, the drain pipe connecting portion 35$a$, and the breather pipe connecting portion 35$b$ are provided to be adjacent to each other in the tank bottom wall 35. That is, the lower end portion 51$b$ of the path member 51, the lower end portion 52$b$ of the drain pipe 52, and the lower end portion 53$b$ of the breather pipe 53 are provided to be adjacent to each other in the tank bottom wall 35. The lower end portion 51$b$, the lower end portion 52$b$, and the lower end portion 53$b$ are provided to be substantially parallel to each other. Therefore, the lower end portion 51$b$, the lower end portion 52$b$, and the lower end portion 53$b$ can be disposed compactly, and the path member 51, the drain pipe 52, and the breather pipe 53 can be easily arranged.

As described above, according to the embodiment of the present invention, the saddle-type vehicle 10 includes the fuel tank 29, the tank cap 40 that covers the refueling port 50$c$ provided in the fuel tank 29 in an openable/closable manner, and the operation cable 41 that performs an unlocking operation of the tank cap 40, wherein the fuel tank 29 includes the first opening 61 and the second opening 62 that extend through the fuel tank 29, the path member 51 is provided which passes through the interior of the fuel tank 29 and connects the first opening 61 and the second opening 62, the operation cable 41 is arranged through the interior of the path member 51, and the operation cable 41 protruding outward from the first opening 61 is connected to the unlocking mechanism 70 for unlocking the tank cap 40.

With such a configuration, since the operation cable 41 is arranged through the interior of the path member 51 that passes through the interior of the fuel tank 29, the operation cable 41 can be hidden with a simple structure and can be arranged with an excellent appearance. The operation cable 41 is guided by the path member 51 over the path from the second opening 62 to the first opening 61. This makes it possible to stabilize the arrangement path of the operation cable 41 and operate the operation cable 41 satisfactorily.

The path member 51 is formed in a pipe shape and is connected to the fuel tank 29 only by the first opening 61 and the second opening 62.

With such a configuration, the path member 51 can be arranged by a short path and the operation cable 41 can be shortened.

In the path member 51, the first bent portion 51*c* (bent portion) and the second bent portion 51*e* (bent portion) are provided between the first opening 61 and the second opening 62, the first bent portion 51*c* closest to the second opening 62 in the axial direction of the path member 51 out of the first bent portion 51*c* and the second bent portion 51*e* is bent toward the first opening 61 side, and the distance L1 between the first bent portion 51*c* and the second opening 62 is smaller than the distance L2 between the first bent portion 51*c* and the first opening 61 in the axial direction of the path member 51.

With such a configuration, the path member 51 can be arranged by a short path and the operation cable 41 can be shortened.

Furthermore, the lid member 73 is provided to close the end on the first opening 61 side of the path member 51, and the operation cable 41 extends outward through the interior of the lid member 73 and is connected to the unlocking mechanism 70.

With such a configuration, the intrusion of water and dust to the path member 51 can be effectively suppressed by the lid member 73.

The unlocking mechanism 70 contacts the lid member 73 during the unlocking operation.

With such a configuration, since the operation of the unlocking mechanism 70 can be stopped using the lid member 73, the operation of the unlocking mechanism 70 can be stopped without using a dedicated member for stopping the unlocking mechanism 70. In addition, since the load on the operation cable 41 can be reduced when the operation of the unlocking mechanism 70 is stopped, the unlocking operation can be performed satisfactorily even without increasing the thickness of the operation cable 41.

In addition to the path member 51, the drain pipe 52 and the breather pipe 53 are arranged through the interior of the fuel tank 29, and the path member 51 is bundled together with the drain pipe 52 and the breather pipe 53.

With such a configuration, the path member 51 can be supported in the fuel tank 29 using the drain pipe 52 and the breather pipe 53 with a simple structure. It is only required that at least one of the drain pipe 52 and the breather pipe 53 is bundled together with the path member 51.

The fuel tank 29 includes the drain pipe connecting portion 35*a* to which the lower end portion 52*b* of the drain pipe 52 is connected, and the breather pipe connecting portion 35*b* to which the lower end portion 53*b* of the breather pipe 53 is connected, the drain pipe 52 extends outward from the drain pipe connecting portion 35*a*, the breather pipe 53 extends outward from the breather pipe connecting portion 35*b*, and the second opening 62 is provided to be adjacent to the drain pipe connecting portion 35*a* and the breather pipe connecting portion 35*b*.

With such a configuration, since the second opening 62, the drain pipe connecting portion 35*a*, and the breather pipe connecting portion 35*b* are provided to be adjacent to each other, the path member 51, the drain pipe 52, and the breather pipe 53 can be disposed collectively. This makes it possible to easily arrange the path member 51, the drain pipe 52, and the breather pipe 53 in the fuel tank 29. It is only required that the second opening 62 is provided to be adjacent to at least one of the drain pipe connecting portion 35*a* and the breather pipe connecting portion 35*b*.

The path member 51 includes the inclined portion 51*d* that extends in the vehicle front-rear direction and obliquely in the up-down direction in the fuel tank 29, as viewed from the side of the vehicle.

With such a configuration, the path member 51 can be arranged by a short path and the operation cable 41 can be shortened.

In the first opening 61, the path member 51 is attached to the fuel tank 29 in parallel to the axis line 40*b* of the tank cap 40.

With such a configuration, since in the first opening 61, the path member 51 extends in parallel to the axis line 40*b* of the tank cap 40, the operation cable 41 also extends in parallel to the axis line 40*b* of the tank cap 40. Therefore, the operation cable 41 can be disposed near the tank cap 40, and the operation cable 41 can be shortened.

The unlocking mechanism 70 includes the locking member 71 that engages with the tank cap 40 to lock the tank cap 40, and the operation cable 41 is collected to the locking member 71 so that the operation cable 41 operates the locking member 71 to release the lock.

With such a configuration, the operation cable 41 is connected to the tank cap 40 through the locking member 71. Therefore, the load acting on the operation cable 41 from the tank cap 40 side is reduced by the locking member 71. Therefore, the operation cable 41 has excellent durability.

The solenoid 42 is provided which drives the operation cable 41, the operation cable 41 that extends outward from the second opening 62 is connected to the solenoid 42, and the solenoid 42 is disposed under the upper surface 40*a* of the tank cap 40.

With such a configuration, the solenoid 42 can be disposed compactly under the upper surface 40*a* of the tank cap 40. This configuration makes it difficult to access the solenoid 42 from the outside, which can provide excellent anti-theft performance. Furthermore, since the solenoid 42 can be disposed near the battery 34, the solenoid 42 can be easily connected to the battery 34 through the electric wire 34*a* and the electric wire 43.

The extension direction 80 of the operation cable 41 that extends outward from the second opening 62 is the same direction as the connection direction between the operation cable 41 and the solenoid 42.

With such a configuration, the driving force of the solenoid 42 can be transmitted to the operation cable 41 efficiently, and the operation cable 41 can be operated satisfactorily.

Furthermore, the control unit 33 is provided which performs drive control of the solenoid 42, and the control unit 33 is disposed under an upper surface 40a of the tank cap 40.

With such a configuration, the control unit 33 can be disposed compactly under the upper surface 40a of the tank cap 40. Furthermore, since the solenoid 42 can be disposed near the control unit 33, the solenoid 42 and the control unit 33 can be easily connected to each other with the short electric wire 43.

The solenoid 42 is disposed below the fuel tank 29.

With such a configuration, the solenoid 42 can be disposed compactly below the fuel tank 29. This configuration makes it difficult to access the solenoid 42 from the outside, which can provide excellent anti-theft performance. Furthermore, since the solenoid 42 can be disposed near the battery 34, the solenoid 42 can be easily connected to the battery 34 through the electric wire 34a and the electric wire 43.

The control unit 33 is disposed below the fuel tank 29.

With such a configuration, the control unit 33 can be disposed compactly below the fuel tank 29. Furthermore, since the solenoid 42 can be disposed near the control unit 33, the solenoid 42 and the control unit 33 can be easily connected to each other with the short electric wire 43.

The above-described embodiment merely represents one aspect of the present invention, and the present invention is not limited to the above-described embodiment.

In the above-described embodiment, the case has been described in which the path member 51 is connected to the fuel tank 29 only by the first opening 61 and the second opening 62, but the present invention is not limited thereto. For example, in the section between the first opening 61 and the second opening 62, the path member 51 may be provided to contact the inner surface of the fuel tank 29 along the inner surface of the fuel tank 29.

In the above-described embodiment, the case has been described in which the lower end portion 51b of the path member 51 is disposed perpendicularly to the tank bottom wall 35, but the present invention is not limited thereto. For example, the lower end portion 51b may be disposed to extend in the vertical direction through the tank bottom wall 35. In this case, the extension direction of the operation cable 41 that extends downward from the second opening 62 becomes the vertical direction, and the driving direction of the solenoid 42 is also set to the vertical direction.

In the above-described embodiment, the case has been described in which the solenoid 42 and the control unit 33 are disposed under the upper surface 40a of the tank cap 40 and below the fuel tank 29, but the present invention is not limited thereto. For example, the solenoid 42 and the control unit 33 may be disposed under the upper surface 40a of the tank cap 40 and below the rear seat 17b.

Furthermore, in the above-described embodiment, the motorcycle is described as an example of the saddle-type vehicle 10, but the present invention is not limited thereto. The present invention is applicable to a three-wheeled vehicle including two front wheels or two rear wheels and saddle-type vehicles including four or more wheels.

Configurations Supported by Aforementioned Embodiment

The aforementioned embodiment supports the following configurations.

(Configuration 1) A saddle-type vehicle comprising a fuel tank, a tank cap that covers a refueling port provided in the fuel tank in an openable/closable manner, and an operation cable that performs an unlocking operation of the tank cap, wherein the fuel tank comprises a first opening and a second opening that extend through the fuel tank, a path member is provided which passes through an interior of the fuel tank and connects the first opening and the second opening, the operation cable is arranged through an interior of the path member, and the operation cable protruding outward from the first opening is connected to an unlocking mechanism for unlocking the tank cap.

With such a configuration, since the operation cable is arranged through the interior of the path member that passes through the interior of the fuel tank, the operation cable can be hidden with a simple structure and can be arranged with an excellent appearance. The operation cable is guided by the path member over the path from the second opening to the first opening. This makes it possible to stabilize the arrangement path of the operation cable and operate the operation cable satisfactorily.

(Configuration 2) The saddle-type vehicle according to Configuration 1, wherein the path member is formed in a pipe shape and is connected to the fuel tank only by the first opening and the second opening.

With such a configuration, the path member can be arranged by a short path and the operation cable can be shortened.

(Configuration 3) The saddle-type vehicle according to Configuration 1 or 2, wherein in the path member, at least one of bent portions is provided between the first opening and the second opening, a first bent portion closest to the second opening in an axial direction of the path member out of the bent portions is bent toward the first opening side, and a distance between the first bent portion and the second opening is smaller than a distance between the first bent portion and the first opening in the axial direction of the path member.

With such a configuration, the path member can be arranged by a short path and the operation cable can be shortened.

(Configuration 4) The saddle-type vehicle according to any one of Configurations 1 to 3, wherein a lid member is provided to close an end on the first opening side of the path member, and the operation cable extends outward through an interior of the lid member and is connected to the unlocking mechanism.

With such a configuration, the intrusion of water and dust to the path member can be effectively suppressed by the lid member.

(Configuration 5) The saddle-type vehicle according to Configuration 4, wherein the unlocking mechanism contacts the lid member during an unlocking operation.

With such a configuration, since the operation of the unlocking mechanism can be stopped using the lid member, the operation of the unlocking mechanism can be stopped without using a dedicated member for stopping the unlocking mechanism. In addition, since the load on the operation cable can be reduced when the operation of the unlocking mechanism is stopped, the unlocking operation can be performed satisfactorily even without increasing the thickness of the operation cable.

(Configuration 6) The saddle-type vehicle according to any one of Configurations 1 to 5, wherein pipes in addition to the path member are arranged through the interior of the fuel tank, and the path member is bundled together with at least one of the pipes.

With such a configuration, the path member can be supported in the fuel tank using the pipe with a simple structure.

(Configuration 7) The saddle-type vehicle according to Configuration 6, wherein the fuel tank comprises pipe connecting portions to which one end portions of the pipes are connected, and the pipes extend outward from the respective pipe connecting portions, and the second opening is provided to be adjacent to at least one of the pipe connecting portions.

With such a configuration, since the second opening and the pipe connecting portions are adjacent to each other, the path member and pipes can be disposed collectively and the path member and the pipes can be easily arranged.

(Configuration 8) The saddle-type vehicle according to any one of Configurations 1 to 7, wherein the path member comprises an inclined portion that extends in a vehicle front-rear direction and obliquely in an up-down direction in the fuel tank as viewed from a side of the vehicle.

With such a configuration, the path member can be arranged by a short path and the operation cable can be shortened.

(Configuration 9) The saddle-type vehicle according to any one of Configuration 1 to 8, wherein in the first opening, the path member is attached to the fuel tank in parallel to an axis line of the tank cap.

With such a configuration, since in the first opening, the path member extends in parallel to the axis line of the tank cap, the operation cable also extends in parallel to the axis line of the tank cap. Therefore, the operation cable can be disposed near the tank cap, and the operation cable can be shortened.

(Configuration 10) The saddle-type vehicle according to any one of Configuration 1 to 9, wherein the unlocking mechanism comprises a locking member that engages with the tank cap to lock the tank cap, and the operation cable is connected to the locking member so that the operation cable operates the locking member to release a lock.

With such a configuration, the operation cable is connected to the tank cap through the locking member. Therefore, the load acting on the operation cable from the tank cap side is reduced by the locking member. Therefore, the operation cable has excellent durability.

(Configuration 11) The saddle-type vehicle according to any one of Configuration 1 to 10, wherein a solenoid is provided which drives the operation cable, and the operation cable that extends outward from the second opening is connected to the solenoid, and the solenoid is disposed under an upper surface of the tank cap.

With such a configuration, the solenoid can be disposed compactly under the upper surface of the tank cap.

(Configuration 12) The saddle-type vehicle according to Configuration 11, wherein an extension direction of the operation cable that extends outward from the second opening is the same direction as a connection direction between the operation cable and the solenoid.

With such a configuration, the driving force of the solenoid can be transmitted to the operation cable efficiently, and the operation cable can be operated satisfactorily.

(Configuration 13) The saddle-type vehicle according to Configuration 11 or 12, wherein a control unit is provided which performs drive control of the solenoid, and the control unit is disposed under the upper surface of the tank cap.

With such a configuration, the control unit can be disposed compactly under the upper surface of the tank cap. In addition, since the solenoid and the control unit are disposed under the upper surface of the tank cap, the solenoid and the control unit can be easily connected to each other.

(Configuration 14) The saddle-type vehicle according to Configuration 13, wherein the solenoid is disposed below the fuel tank.

With such a configuration, the solenoid can be disposed compactly below the fuel tank.

(Configuration 15) The saddle-type vehicle according to Configuration 13 or 14, wherein the control unit is disposed below the fuel tank.

With such a configuration, the control unit can be disposed compactly below the fuel tank.

In addition, the solenoid and the control unit can be easily connected to each other below the fuel tank.

REFERENCE SIGNS LIST

10 Saddle-type vehicle
29 Fuel tank
33 Control unit
35$a$ Drain pipe connecting portion (pipe connecting portion)
35$b$ Breather pipe connecting portion (pipe connecting portion)
40 Tank cap
40$a$ Upper surface
40$b$ Axis line
41 Operation cable
42 Solenoid
50$c$ Refueling port
51 Path member
51$c$ First bent portion (bent portion)
51$d$ Inclined portion
51$e$ Second bent portion (bent portion)
52 Drain pipe (pipe)
52$b$ Lower end portion (one end portion of pipe)
53 Breather pipe (pipe)
53$b$ Lower end portion (one end portion of pipe)
61 First opening
62 Second opening
70 Unlocking mechanism
71 Locking member
73 Lid member
80 Extension direction
L1 Distance (distance between first bent portion and second opening)
L2 Distance (distance between first bent portion and first opening)

The invention claimed is:

1. A saddle-type vehicle, comprising:
a fuel tank;
a tank cap that covers a refueling port provided in the fuel tank in an openable/closable manner; and
an operation cable that performs an unlocking operation of the tank cap,
wherein the fuel tank comprises a first opening and a second opening that extend through the fuel tank,
a path member is provided which passes through an interior of the fuel tank and connects the first opening and the second opening,
the operation cable is arranged through an interior of the path member, and
the operation cable protruding outward from the first opening is connected to an unlocking mechanism for unlocking the tank cap.

2. The saddle-type vehicle according to claim 1, wherein the path member is formed in a pipe shape and is connected to the fuel tank only by the first opening and the second opening.

3. The saddle-type vehicle according to claim 1, wherein in the path member, at least one of bent portions is provided between the first opening and the second opening, a first bent portion closest to the second opening in an axial direction of the path member out of the bent portions is bent toward the first opening side, and a distance between the first bent portion and the second opening is smaller than a distance between the first bent portion and the first opening in the axial direction of the path member.

4. The saddle-type vehicle according to claim 1, wherein a lid member is provided to close an end on the first opening side of the path member, and the operation cable extends outward through an interior of the lid member and is connected to the unlocking mechanism.

5. The saddle-type vehicle according to claim 4, wherein the unlocking mechanism contacts the lid member during an unlocking operation.

6. The saddle-type vehicle according to claim 1, wherein pipes in addition to the path member are arranged through the interior of the fuel tank, and the path member is bundled together with at least one of the pipes.

7. The saddle-type vehicle according to claim 6, wherein the fuel tank comprises pipe connecting portions to which one end portions of the pipes are connected, and the pipes extend outward from the respective pipe connecting portions, and the second opening is provided to be adjacent to at least one of the pipe connecting portions.

8. The saddle-type vehicle according to claim 1, wherein the path member comprises an inclined portion that extends in a vehicle front-rear direction and obliquely in an up-down direction in the fuel tank as viewed from a side of the vehicle.

9. The saddle-type vehicle according to claim 1, wherein in the first opening, the path member is attached to the fuel tank in parallel to an axis line of the tank cap.

10. The saddle-type vehicle according to claim 1, wherein the unlocking mechanism comprises a locking member that engages with the tank cap to lock the tank cap, and the operation cable is connected to the locking member so that the operation cable operates the locking member to release a lock.

11. The saddle-type vehicle according to claim 1, wherein a solenoid is provided which drives the operation cable, and the operation cable that extends outward from the second opening is connected to the solenoid, and the solenoid is disposed under an upper surface of the tank cap.

12. The saddle-type vehicle according to claim 11, wherein an extension direction of the operation cable that extends outward from the second opening is the same direction as a connection direction between the operation cable and the solenoid.

13. The saddle-type vehicle according to claim 11, wherein a control unit is provided which performs drive control of the solenoid, and the control unit is disposed under the upper surface of the tank cap.

14. The saddle-type vehicle according to claim 13, wherein the solenoid is disposed below the fuel tank.

15. The saddle-type vehicle according to claim 13, wherein the control unit is disposed below the fuel tank.

* * * * *